_United States Patent Office_

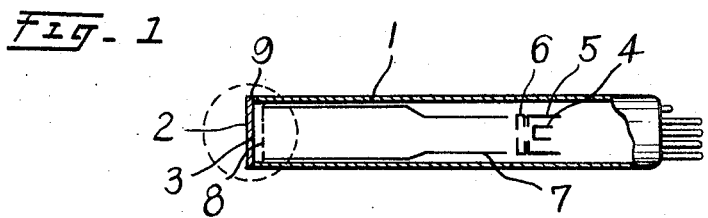
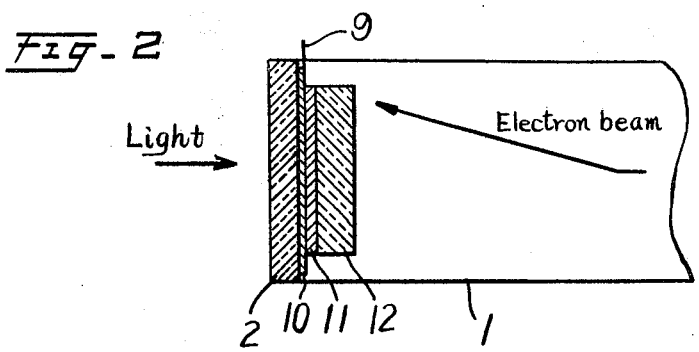
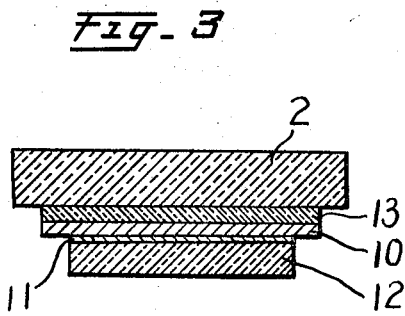
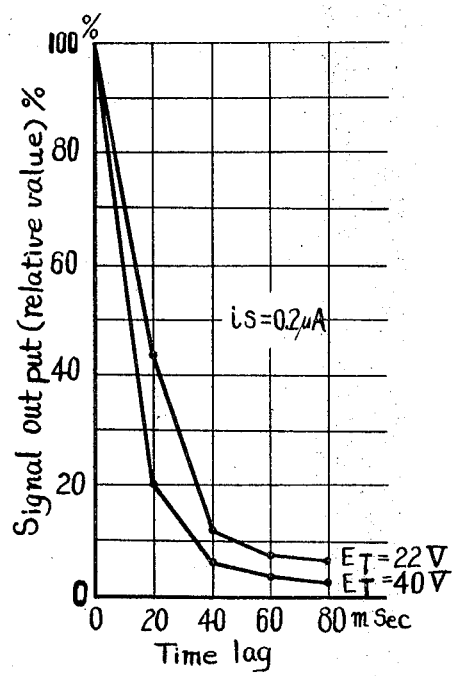

3,517,241
Patented June 23, 1970

3,517,241
PHOTOCONDUCTIVE TARGET COMPRISING ALUMINUM, SELENIUM AND ARSENIC TRISELENIDE LAYERS
Naohiro Goto and Keiichi Shidara, Tokyo, Japan, assignors to Japan Broadcasting Corporation, Tokyo, Japan
Filed June 19, 1967, Ser. No. 646,892
Claims priority, application Japan, Aug. 31, 1966, 41/56,882, 41/56,883, 41/56,886
Int. Cl. H01j 31/26, 31/38
U.S. Cl. 313—65                     6 Claims

ABSTRACT OF THE DISCLOSURE

The present invention relates to an improvement of a target of photoconductive type camera tube having a photoconductive layer, comprising a blocking contact layer. The target according to the invention consists of two layers, which are a semiconductor layer forming the blocking contact and a photoconductive layer. According to the invention, arsenic triselenide can successfully be used in the substance of photoconductive layer, and by this means the target of the invention mitigates the drawbacks of conventional camera tube of this kind such as, less sensitivity for red light, incomplete stability for use as a camera tube, and other difficulties at manufacturing of the tubes. This invention affords a great advantage in obtaining an excellent target, especially suitable for the practical use as for a target of camera tube for use in color television field.

BACKGROUND OF THE INVENTION

The present invention relates to a target of a photoconductive camera tube and the forming practice, which target comprising a photoconductive layer forming a photoelectric target surface.

The camera tube of this kind has for its advantages in that possibility of making compact size and light weight, comparatively simple in construction and easiness in handling. By the viewpoint of the advantages, it was a long year's desire in this technical field to obtain such kind of camera tube having sufficient characteristics suitable for use in television purpose. However, such a camera tube has not been developed yet, which fulfills necessary conditions for use in color television camera tube, especially in the viewpoint of the spectral sensitivity characteristics, the stability and the sensitivity.

This is owing to the fact that a photoconductive substance, which has a spectral sensitivity characteristics suitable for use in color television purpose, and is suitable for formation of blocking contact and also fulfills a condition of chemical stability, was not found before, although it was known to use a photoconductive layer forming blocking contact for the target of photoconductive type camera tube.

A camera tube of prior art belonging to the same technical field of this invention is known as a trade name "Plumbicon" developed by N. V. Philips of Netherlands. Said camera tube uses lead monoxide (PbO) for the photoconductive substance. The target of this camera tube comprises a photoconductive layer forming blocking contact with said lead monoxide (PbO) photoconductive substance. This camera tube has advantages of being satisfactory in sensitivity, dark current and time lag characteristics of the after image. However, such known camera tube has still disadvantages, particularly in less sensitivity for red color light, in the necessity of higher technical requirements in the manufacturing, and in limitation of tending to deteriorate caused by residual gases remaining in the tube when it is composed as a camera tube.

Said disadvantages may be unavoidable as far as lead monoxide (PbO) is used for photoconductive substance composing the target of a camera tube.

It seems that these disadvantages are caused by the following facts. Lead monoxide (PbO) has a considerable large energy gap in the energy zone, for instance 2.7 ev. in case of orthorhombic system and 2.0 ev. in case of tetragonal system, and since this energy gap has a close relation to the spectral sensitivity characteristics of photoconductive substance, sensitivity for red color light becomes lower and hence sufficient characteristic for use as a target of a camera tube of color television system cannot be obtained. Then, lead monoxide (PbO) photoconductive substance has not enough chemical stability which makes it require a special treatment for the formation of the target and incidentally a higher technical requirement is imposed in the manufacturing of the camera tube. Moreover, when a camera tube is composed a slight amount of residual gases in the tube react gradually with the substance during a long time, therefore practical stability for use as a camera tube is insufficient. Namely by the residual gases the target tends to deteriorate during the practical use of the tube.

SUMMARY OF THE INVENTION

The present invention relates to a novel target of photoconductive type camera tube and forming process thereof which having a sufficient sensitivity for the red color light, while keeping advantages of blocking contact of photoconductive layer such as higher sensitivity, low dark current characteristics and low after image characteristics.

The present invention has for its object to mitigate various disadvantages of the known camera tubes as mentioned as above, and to obtain a novel target of a camera tube having a stabilized operational characteristics by using a novel construction of the target. The present invention also concerns for the producing practice of the target.

In order to accomplish aforementioned object of the invention, the target of the photoconductive type camera tube of the present invention has its feature in that an aluminum (Al) film is applied by vaporization on a glass plate forming target surface of the tube and acts as an optical window of a camera tube, a selenium blocking contact layer is applied onto the film, then a photoconductive layer is applied thereon by applying layer of arsenic triselenide ($As_2Se_3$) by vaporization.

According to the invention the photoconductive layer is consist of at least two layers, a semiconductor layer forming the blocking contact and a semiconductor layer mainly effective for the improvement of spectral sensitivity characteristics. First layer of the multiple layer is substantially made of selenium (Se), and second layer thereof is made of arsenic triselenide ($As_2Se_3$).

According to the layer construction of the target of the invention, the target of the invention has both characteristics of an excellent photoconductive effect by the blocking contact and characteristics of sufficient sensitivity for red light which is inherent to arsenic triselenide. Energy gap of arsenic triselenide ($As_2Se_3$) is considered to be 1.55–1.8 ev., and is generally considered to be 1.7 ev., which is considerably narrower than that of lead monoxide (PbO).

The present invention affords another advantage for the easy handling at the manufacture of the tube, when compared with forming of target of conventional tube, such as aforementioned "Plumbicon," since arsenic triselenide ($As_2Se_3$) forming a part of the target has a great chemical stability.

Moreover, when a tube is composed according to the invention there is another advantage owing to the fact that the substance is hardly affected by residual gases in the tube hence the operation and performance characteristics have a great stability.

Generally, if arsenic triselenide ($As_2Se_3$) is used to form a blocking contact with aluminum (Al) or a transparent conductive film of the electrode, this substance produces a storage phenomena of photoconductive substance, which is peculiar to this substance and hence an effective operation cannot be anticipated for the purpose of an ordinary camera tube.

According to the invention, by merely providing a selenium (Se) layer, said storage phenomena can completely be mitigated and a camera tube having an ideal characteristic of its excellent blocking contact can be obtained.

BRIEF DESCRIPTION OF DRAWING

FIG. 1 is a cross-sectional view of an embodiment of photoconductive type camera tube showing general construction thereof, FIG. 2 is a schematic view of a target according to the invention showing construction of a target portion encircled in the dotted line of FIG. 1, FIG. 3 is a schematical cross-sectional view of modified embodiment according to the invention, FIG. 4 is a time lag characteristics of a target of camera tube according to the invention under different target voltages.

DESCRIPTION OF PREFERRED EMBODIMENTS

FIG. 1 shows general construction of a typical embodiment of a photoconductive type camera tube. In FIG. 1, 1 is an envelope of a camera tube, 2 is a window of incident light image, 3 is a target comprising photoconductive film, 4 is a cathode, 5, 6, 7 and 8 are first, second, third and fourth grids respectively, and 9 is a target electrode connection for deriving the signal.

The present invention concerns mainly for the target portion as shown encircled by the dotted line. FIG. 2 is a cross-sectional view showing basical construction of the target portion. In this figure, each layer is shown in an extremely exaggerated scale in order to clearly show the construction of the target of the invention.

In FIG. 2, 2 is a transparent glass plate forming as the window of the incident light provided on the glass envelope 1, 10 is a thin aluminum film which is suitable to form a blocking contact with selenium (Se) and having a minimum thickness to have a conductivity to act as a signal electrode. This aluminum film 10 is applied by vaporization onto the surface of the glass plate in an extremely thin thickness in order not to disturb the permeance of the incidental light. 11 is a blocking contact layer mainly consisting of selenium (Se) to form a blocking contact with the thin film 10. The blocking contact between the aluminum thin film 10 and the selenium layer 11 produces a semiconductor effect. The aluminum film 10 forming the blocking contact can be sufficiently thin so that the light absorption may be kept in a very small extent, since the film may have a thickness required to act as a signal electrode.

12 is an arsenic triselenide ($As_2Se_3$) layer vaporized over the selenium (Se) layer 11 which forms the blocking contact. This layer 12 contributes for the main part of the spectral sensitivity characteristics as to act as a target of camera tube.

The arsenic triselenide ($As_2Se_3$) used for this photoconductive layer has a much narrower energy gap compared with that of lead monoxide (PbO) used in the photoconductive layer of known camera tube such as aforementioned "Plumbicon." Accordingly it is possible to obtain a target having an excellent sensitivity for red light, if compared with a known camera tube having a blocking contact type target using lead monoxide. This layer of arsenic triselenide has also a very stable chemical property, therefore it does not show an abrupt chemical reaction even though it is laid in air.

The present invention utilizes a high stable substance for the main ingredient of the photoconductive element and uses a multiple layer construction by combining a blocking contact forming layer of selenium therewith.

The aforementioned thin aluminum film is constructed to act as an electrode for deriving the output of the camera tube and as an applying electrode of the operational voltage source.

The present invention is not limited to the arsenic triselenide ($As_2Se_3$) in the form of a glassy layer, but is also possible to make a multiple layer construction of porous layer and the glassy layer in order to obtain a suitable value of capacity required for the target of camera tube.

There is not a clear boundary between selenium (Se) layer and arsenic triselenide ($As_2Se_3$) layer as more fully be understood by the description mentioned hereinafter. In some cases, arsenic is mixed in the selenium layer in an excess amount, in order to prevent crystallization of the layer, in which case the percentage of selenium gradually decreases from the inner part of the selenium (Se) layer toward the arsenic triselenide layer and selenium is transferred and gradually increase in the opposite manner in the arsenic triselenide ($As_2Se_3$) layer. Such a target construction, wherein arsenic selenides such as ($As_3Se_5$) are included at the boundary of the layers may also be included in the scope of this invention.

In the basical construction of the invention as described with reference to FIG. 2, aluminum (Al) film is vaporized directly on the glass wall forming the target window. This aluminum film forms a blocking contact with the selenium layer subsequently applied thereon. In this construction the thin aluminum (Al) film has two functions, i.e. to form a blocking contact layer with selenium (Se) and to form an electrode acting as a signal deriving electrode and also supplying electrode of the operational voltage. It is also possible to provide a transparent conducting film acting only as an electrode and to apply an aluminum film forming blocking contact with selenium by vaporization onto the electrode.

FIG. 3 shows such a modified embodiment. In this figure, 2 is a transparent glass plate acting as an incidental light window of the envelope of the camera tube, 13 is a transparent conducting layer such as, for instance NESA, 10 is a metal layer of aluminum (Al) forming a blocking contact with selenium (Se), 11 is selenium (Se) layer forming the blocking contact with the metal layer and 12 is vaporized layer of arsenic triselenide ($As_2Se_3$).

In this embodiment, aluminum layer 10 acts only to form blocking contact with selenium layer. The signal deriving and voltage applying electrode is consisted by the transparent conducting film 13. According to the construction, an effective camera tube can be obtained wherein the light loss is extremely reduced. Also by this construction it is possible to obtain a blocking contact of high quality so that a camera tube having an improved target can be obtained.

When such kind of blocking contact type photoconductive layer is used in a target of photoconductive type camera tube, barrier capacitance of depletion-layer in the blocking contact must be selected in a range of suitable value. This barrier capacitance of the depletion-layer has a close relation for the time lag of after image and has a great influence for the characteristics of the camera tube. Accordingly the capacitance value is desired to be a suitable value for use as a camera tube.

According to the invention, in order to make this barrier capacitance of depletion-layer to be a suitable value, the formation of arsenic triselenide ($As_2Se_3$) layer is carried out by using a vaporization source of arsenic triselenide ($As_2Se_3$) wherein an excess amount of selenium (Se) is mixed, and by selecting the excess amount of selenium (Se) to be suitable value, the barrier capacitance of depletion-layer is decreased to a suitable value.

The target of camera tube produced by aforementioned process may also be included in the scope of the present invention.

FIG. 4 shows time lag characteristics of a target of photoconductive type camera tube according to the invention.

As apparently observed by the drawing, the target of photoconductive type camera tube of the invention has a characteristic of producing 4% signal output after the time of three fields of standard television signal used in the U.S.A. and Japan in case of 40 v. target voltage and about 8% signal output in case of 22 v. target voltage $E_T$.

The time lag of the after image has been remarkably reduced compared with the conventional camera tube of this type. In this example signal output current is selected as a constant value of 0.2 μa.

The forming process of the target according to the invention will be described with referring to FIG. 2 and FIG. 3 hereinafter.

A glass plate which forms a face plate and acts as an optical window of the camera tube is located in a vacuum evaporator. An aluminum (Al) film 10 is evaporated either directly onto the glass wall surface forming the target and make this aluminum film as a blocking contact with selenium or such a aluminum (Al) film is vaporized onto a transparent conducting film 13, which is applied onto the glass wall and composed of such as for instance NESA. The vaporization of aluminum (Al) film is carried out by a manner previously known. In case of the aluminum (Al) film is directly vaporized on the glass wall as shown in FIG. 2, the thickness of the film is selected to minimum thickness to obtain a sufficient conductivity to act as a signal electrode and also to act as a blocking contact with the selenium (Se).

Then, selenium (Se) is applied onto the aluminum (Al) film 10 formed in a prescribed manner. The selenium (Se) is vaporized to form a thin film 11. By this means, a blocking contact is formed between said thin films owing to the difference of energy level of each of the substances of the films.

Then, arsenic triselenide ($As_2Se_3$) layer 12 is vaporized thereon. This vaporization process has a close relation to the characteristics of the target of the photoconductive type camera tube. Various processes of the vaporization will be described in detail hereinafter.

EMBODIMENT 1

A glass plate to be formed for the target is placed in the vacuum evaporator, then the transparent conductive film and aluminum (Al) film are successively applied on the glass plate by vaporization which is known per se. Arsenic triselenide ($As_2Se_3$) and selenium (Se) are mixed in a weight ratio of 1.8 g. arsenic triselenide and 0.1–0.2 g. selenium. This mixture is introduced in the vaporization boat to act as vaporization material, this vaporization material is heated and degased in an atmosphere of inert gas, such as argon (Ar) gas. Then, the inert gas is evacuated by a vacuum pump to make high vacuum and the material is applied by vaporization onto the film surface of the aluminum (Al). In this case, owing to difference of vaporization temperature of selenium (Se) and arsenic triselenide ($As_2Se_3$), at first a selenium (Se) layer containing a slight amount of arsenic (As) is vaporized, then arsenic triselenide ($As_2Se_3$) layer which includes gradually decreasing selenium (Se) mixing content is vaporized to make a continuous layer. By this process, selenium (Se) layer and arsenic triselenide ($As_2Se_3$) layer are formed, a blocking contact is formed between said aluminum (Al) film and initially vaporized selenium (Se) film, and arsenic triselenide ($As_2Se_3$) layer is vaporized onto the blocking contact layer. By this process, the target according to the invention is obtained. It is also possible to obtain a camera tube having a small time lag characteristic by vaporizing multiple layer of porous layer and glassy layer over the arsenic triselenide ($As_2Se_3$) layer as formed in the above mentioned process.

EMBODIMENT 2

A glass plate applied with a transparent conductive film and successively applied aluminum film by a manner described in the aforementioned embodiment, is placed in the vacuum evaporator. Then, arsenic (As) and selenium (Se) are mixed in the vaporization boat in a ratio of excessing amount of selenium compared with the quantity of chemical equivalent of arsenic triselenide, which is arsenic 38.8% and selenium 61.2% by weight. Said mixture is heated in an atmosphere of inert gas for instance argon (Ar) gas and melted.

Then, after applying selenium (Se) layer onto the surface of aluminum (Al) film by vaporization in a high vacuum to form a blocking contact layer, the mixture of arsenic triselenide ($As_2Se_3$) is vaporized in the same atmosphere to form the glassy layer, thereafter the arsenic triselenide ($As_2Se_3$) is vaporized in an argon (Ar) atmosphere of $5 \times 10^{-1}$ mm. Hg pressure. The porous layer of the mixture is formed. Then, the argon gas is evacuated by a vacuum pump to make a high vacuum and then the substance is vaporized to form a glassy layer. Then, a target having multiple layer of porous layer and glassy layer of arsenic triselenide ($As_2Se_3$) can be obtained. In this embodiment, the following quantity of the material shown in the weight is preferred.

TABLE

| | As (percent) | Se (percent) |
|---|---|---|
| Allowable limit | 35.8–38.3 | 64.2–61.7 |
| Optimum value | 37.8 | 62.2 |

EMBODIMENT 3

Aluminum (Al) film is applied onto the glass plate substratum as described in the Embodiments 1 and 2. At the time of vaporizing the selenium (Se), arsenic (As) is mixed to form a mixed selenium layer containing 15%–22% by weight of arsenic, thereafter arsenic triselenide ($As_2Se_3$) is vaporized to form a layer thereon and target construction shown in FIG. 2 or FIG. 3 may be obtained.

According to the forming process, the disadvantages when constructing a camera tube by using a target which is formed by vaporization of amorphous selenium only may be removed.

This is owing to the fact that the amorphous selenium is tend to form a crystal in a comparatively low temperature, so that this causes to form dotted-like defect on the target when composed in a camera tube. However, a target obtained by a process according to this embodiment of the invention such crystal of selenium layer is not produced, so that life of the camera tube can be elongated and a great advantage of a defectless screen can be obtained. It is found by various experiments, that a target of camera tube formed by amorphous selenium tend to form aforementioned dotted-like defect on the target under a heated temperature of 60° C. and during time of 2 hours. The target formed according to this embodiment is observed entirely not to produce such defect under the same heating temperature, even during 5 hours.

Generally, barrier capacitance value of depletion-layer required in a target of photoconductive type camera tube is about 2,000 pf. or less per unit area in case of 1 inch type camera tube. This capacitance value has a close relation to the time lag characteristics of camera tube. Although the conventional photoconductive layer of target, which is produced by using only arsenic triselenide ($As_2Se_3$) for the photoconductive basic substance and is applied the porous layer and glassy layer applied in gas atmosphere and vacuum respectively, is possible to make geometric capacitance of 1,000–2,000 pf. per 9.5 x 12.7 mm. by the thickness of the target, by the reason of existence of the depletion-layer in the blocking contact zone of the photoconductive layer, the capacitance value may be such a great value of about 10,000 pf.

However, according to the practice of the invention as illustrated in the preceding embodiments, at first blocking layer of selenium (Se) is formed and then arsenic triselenide ($As_2Se_3$) is vaporized by adding the vaporization material an excess amount of selenium (Se). The excess volume of selenium (Se) can be controlled at the formation of arsenic triselenide ($As_2Se_3$) layer so that the barrier capacitance of depletion layer can be controlled. By this process a target of camera tube having a desired capacitance value may easily be obtained.

Said value of barrier capacitance of depletion-layer is determined by a combination of adjustment of the following items, namely pressure of inert gas at the formation of porous layer of arsenic triselenide, thickness of the film of porous layer and film thickness of glassy layer of arsenic triselenide.

It is most important to obtain a required value of the barrier capacitance of the depletion-layer suitable to use as a target of camera tube, an excess quantity of selenium (Se) must be introduced in the process explained in the embodiment. Otherwise, it is difficult to decrease the barrier capacitance of the depletion-layer to a practical value.

As explained clearly heretofore, the target electrode according to the invention has a photoconductive layer consisting of selenium (Se) blocking layer and arsenic triselenide ($As_2Se_3$) layer. The target has a great advantage of having both merits of blocking photoconductive layer, such as low dark current characteristics, high sensitivity characteristics and also an excellent characteristics of arsenic triselenide layer, especially in a supreme spectral sensitivity characteristics for the red light. In accordance with the practice of the invention arsenic triselenide ($As_2Se_3$) is vaporized by adding an excess amount of selenium (Se) higher than the chemical equivalent. By this means, extent of the depletion-layer formed by the blocking contact can be controlled by the process, so that a camera tube having very high quality in respect to time lag characteristics can be obtained. The target of the invention has main ingredient of photoconductive layer as arsenic triselenide ($As_2Se_3$) which has a high chemical stability much higher than lead monoxide (PbO) which is used in the known blocking contact type photoconductive layer of the conventional camera tube such as "Plumbicon," therefore the camera tube of the invention has a great advantage of easiness for handling if compared with the known camera tube such as "Plumbicon," and also it is very easy for the manufacture.

Said conventional type camera tube has also a drawback that lead monoxide (PbO) used in the photoconductive layer tend to gradually react with a small amount of residual gases in the tube and thus to deteriorate the stability of each function of the camera tube. The target of the camera tube according to the invention entirely mitigates such disadvantages and has a supreme stable quality for the practical use, beside of various advantages as mentioned above.

What we claim is:
1. A target of a photoconductive type camera tube comprising:
   (a) a glass plate forming the window of the camera tube,
   (b) a signal electrode comprising a transparent conductive film on said glass plate,
   (c) an aluminum (Al) film on said transparent conductive film,
   (d) a semiconductor layer consisting of selenium (Se) on said aluminum (Al) film,
   (e) said aluminum (Al) film having a thickness corresponding to a minimum thickness necessary for making the film a blocking contact with said semiconductor layer,
   (f) an arsenic triselenide ($As_2Se_3$) layer on said semiconductor layer, wherein the arsenic triselenide ($As_2Se_3$) layer includes an excessive amount of selenium compared with the quantity of chemical equivalent of arsenic triselenide ($As_2Se_3$), said arsenic triselenide layer containing approximately 37.8% by weight As and approximately 62.2% by weight Se,
   (g) said semiconductor layer and the arsenic triselenide ($As_2$-$Se_3$) layer comprising the photoconductive layer of the target.

2. A target of a photoconductive type camera tube according to claim 1 wherein the arsenic triselenide layer (f) contains 37.8% by weight As and 62.2% by weight Se.

3. A target of photoconductive type camera tube according to claim 1 wherein the arsenic triselenide layer is a multiple layer construction of a porous layer and a glassy layer formed by vaporization.

4. A target of photoconductive type camera tube comprising:
   (a) a glass plate forming window of the camera tube,
   (b) an aluminum (Al) film on said glass plate,
   (c) a semiconductor layer consisting of selenium (Se) on the aluminum (Al) film,
   (d) said aluminum (Al) film having a thickness corresponding to a minimum thickness necessary for making the film a blocking contact with said semiconductor layer and to have a sufficient conductivity to act as an electrode,
   (e) an arsenic triselenide ($As_2Se_3$) layer on the semiconductor layer, wherein the arsenic triselenide ($As_2Se_3$) layer includes an excessive amount of selenium compared with the quantity of chemical equivalent of arsenic triselenide ($As_2$-$Se_3$), said arsenic triselenide layer containing approximately 37.8% by weight As and approximately 62.2% by weight Se,
   (f) said semiconductor layer and the arsenic triselenide ($As_2Se_3$) layer comprising the photoconductive layer of the target.

5. A target of a photoconductive type camera tube according to claim 4 wherein the arsenic triselenide layer (f) contains 37.8% by weight As and 62.2% by weight Se.

6. A target of photoconductive type camera tube according to claim 4 wherein the arsenic triselenide layer is a multiple layer construction of a porous layer and a glassy layer formed by vaporization.

References Cited

UNITED STATES PATENTS

| | | |
|---|---|---|
| 3,148,297 | 9/1964 | Schneeberger et al. |
| 3,271,608 | 9/1966 | Rome et al. |
| 3,350,595 | 10/1967 | Kramer. |
| 3,361,919 | 1/1968 | Kiuchi et al. |
| 3,391,297 | 7/1968 | Santilli. |

FOREIGN PATENTS

| | | |
|---|---|---|
| 1,027,841 | 4/1966 | Great Britain. |

ROBERT SEGAL, Primary Examiner

U.S. Cl. X.R.

313—94